June 27, 1967  R. LEHMANN ETAL  3,328,037
PICK-UPS

Filed Nov. 30, 1965  2 Sheets-Sheet 1

INVENTOR
RUEDIGER LEHMANN
JOACHIM HARNISCH

BY Otto John Munz
ATTORNEY

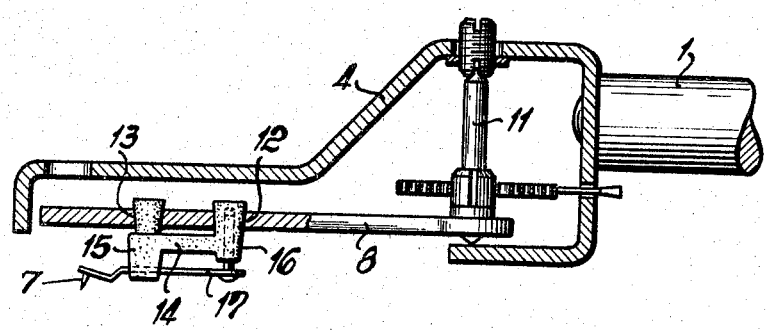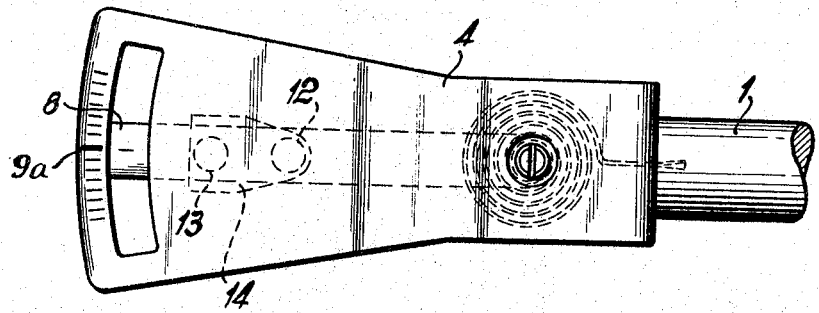

United States Patent Office 3,328,037
Patented June 27, 1967

3,328,037
PICK-UPS
Rüdiger Lehmann and Joachim Harnisch, St. Georgen, Black Forest, Germany, assignors to Dual Gebruder Steidinger, St. Georgen, Germany, a corporation of Germany
Filed Nov. 30, 1965, Ser. No. 510,511
Claims priority, application Germany, Apr. 3, 1965, St 23,622
4 Claims. (Cl. 274—23)

The present invention concerns an apparatus for measuring the antiskating force in pick-ups.

In a pick-up, which is constructed in the form of a unilaterally mounted arm, owing to the finite length of the arm and to the frictional force between scanning needle and record a torque occurs in its pivotal axis which may be compensated by a suitable counter-acting device (antiskating force). The counteracting device is adjustable to enable it to be adapted to various operational conditions, such as e.g. the size of tip used in the scanning needle, the supporting force and the record material.

To permit accurate adjustment, hitherto a record was used which had no grooves but only a smooth surface. The pick-up with its scanning needle was placed on the rotating disc and the antiskating force so adjusted that the pick-up remained stationary. Investigations have proved that this method is only apparently accurate. The actual friction of the scanning needle in a sound groove is different. Direct measurement of this friction, which as such gives a direct measure for the necessary antiskating force, is however relatively complex.

The object of the present invention is to remove these disadvantages.

According to the present invention a device carrier is secured to the pick-up arm on which a pointer disposed substantially parallel to the sound groove and mounted so as to be rotatable about a pivotal point in a plane substantially parallel to the record and from a central position in two directions against the action of a spring, which pointer with a certain spacing from its pivotal point contains a scanning tip corresponding to a pick-up needle. The apparatus in accordance with the invention may be inserted in the pick-up arm in place of the pick-up or possibly also mounted additionally. When adjusting the antiskating device it is only necessary to note that the pointer remains in its central position.

The magnitude of the occurring skating force is relatively low. It amounts only to a fraction of the supporting force of the pick-up. A direct mechanical indication of the deflecting force in accordance with the proposed device relative to a possible measuring with an electromechanical converter has the considerable advantage of simplicity in operation and display and has already been proved among other things for continuous production control. To provide a perfectly visible pointer deflection or reading of certain values a relatively large pointer is required which also possess a corresponding mass.

When making measurements in empty grooves this is without significance, when measuring in modulated grooves however this is adverse and changes the measuring results. Due to the greater dynamic readjusting force different to the pick-up there is no longer measured accurately the frictional force between needle and sound groove acting during playback.

The magnitude of the skating force depends upon various factors, thus, among other things substantially upon the size of the tip rounding radius of the scanning point. On the one hand various sizes are offered on the market and on the other hand the magnitude depends upon the degree of wear. In certain cases therefore hitherto separate correction tables are used when using the measuring device. The use of the measuring device in domestic use would also require such corrections.

In accordance with a further feature of the invention these disadvantages have been removed by the fact that the scanning tip is secured to a needle carrier, the mass of which is within the magnitude conventional in pick-ups and which by interposition of elastic means is interchangeably connected to the pointer.

A particularly convenient feature of the invention is that the elastic means for coupling the needle carrier to the pointer are equipped for receiving a spare pick-up needle.

On the one hand the production of the apparatus is simplified therewith and on the other hand it is possible for the antiskating device to be adjusted by means of the measuring device by shifting the original needle of the pick-up used in the measuring device by simple zero-setting accurately to the value required during playing for the complete compensation, the not insignificant effective degree of wear of the needle also having been taken into consideration.

The invention will be described further, by way of example, with reference to the accompanying drawings, in which:

FIG. 3 is a longitudinal section through a modified measuring device; and

FIG. 4 is a plan view thereof.

Figure 1:
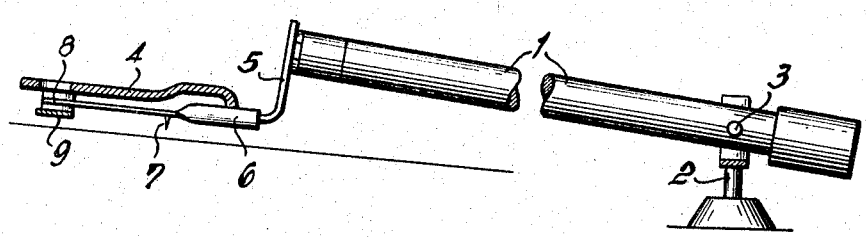
FIG. 1 is a side elevation showing a pick-up arm with the measuring device.
Figure 2:
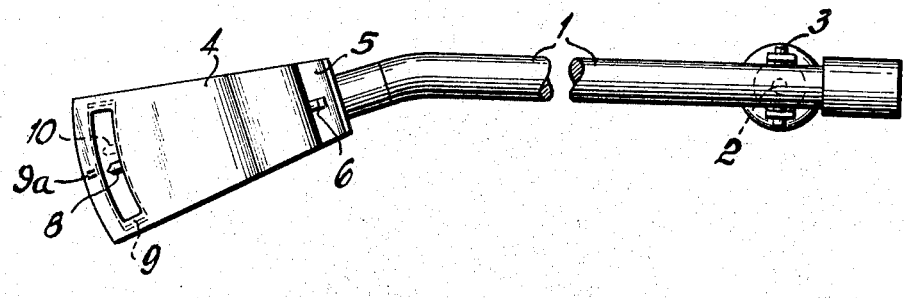
FIG. 2 is a coresponding plan view.

A pick-up arm 1 is pivotally mounted in a socket about a vertical axis 2 and a horizontal axis 3. At the front end it has an apparatus carrier 4 in place of a mountable pick-up and a plate spring 6 is clamped in position on the pick-up arm end 5 of the carrier. A portion of the plate spring 6 is twisted through 90° and close to the twisted position a scanning tip 7 is mounted. The front end is formed as a pointer 8 and guided between the apparatus carrier 4 and a guide rail 9. When the scanning needle is not disposed in the sound groove, the pointer 8 assumes a position opposite a mark 9A. If the known antiskating device, not further shown, is adjusted to act excessively, then the pointer 8 as soon as the scanning tip 7 slides in the groove, is urged into the position 10 shown in broken lines (excessive compensation). By weakening the antiskating force the pointer 8 drifts to the mark 9A, whereby on putting the pick-up into operation instead of the indicating device it is ensured that no uneven needle pressure acts on the flanks of the sound grooves.

It is of course also possible for the apparatus carrier 4 to be so formed that it is adapted to be mounted additionally on the pick-up arm with the pick-up.

The pointer 8 in accordance with the further example as shown in FIGS. 3 and 4 is mounted on its end by way of an axle 11 in the apparatus carrier 4. In the opposite end of the pointer 8 two bores 12, 13 are formed in which a resilient shaped member 14 is inserted. At the front 15 and rear end 16 of the shaped member 14 there are recesses for receiving the needle carrier 17 of a conventional pick-up needle. The shaped member 14, may, of course, also be replaced by a universal clamping device in which various types of pick-up needles fit.

We claim:
1. In a record player including a pick-up arm which at one end is adapted for mounting a pick-up device and close to the other end is mounted so as to be pivotal about a vertical axis and the vertical axis being arranged in such a position relative to a record that the pick-up device end of the pick-up arm when pivoting about the vertical axis is moved over the grooved area of the record for the purpose of scanning, an apparatus carrier detachably secured to the pick-up device end of the pick-up arm, a pointer pivotally mounted on the apparatus carrier and pivotal about an axis parallel to a vertical pick-up axis, a spring element connected on the one hand to the pointer and on the other hand to the carrier in such a manner that the pointer is pivotal from a neutral position against the action of the spring element in two opposite directions about its vertical axis, said carrier being marked for indicating the neutral position of the pointer, the pointer supporting at a certain spaced interval from its vertical pivotal axis a scanning tip for the purpose of engaging in the sound groove of a record.

2. A structure according to claim 1, including a needle support, a scanning tip secured to said needle support, the mass of which is in the magnitude conventional in pick-ups, and resilient means connecting the needle support to the pointer.

3. A structure according to claim 1, including a needle support, a scanning tip secured to said needle support, the mass of which is within that conventional to pick-ups, a socket coupling in said pointer, and elastic means connecting the needle support to the pointer by way of said socket coupling.

4. A structure according to claim 1, including a needle support, a scanning tip secured to said needle support, the mass of which is within that conventional to pick-ups, a coupling, and elastic means connecting the needle support to the pointer by way of said coupling.

No references cited.

LEONARD FORMAN, *Primary Examiner.*

H. N. HAROIAN, *Assistant Examiner.*